United States Patent
Ho et al.

(10) Patent No.: US 11,665,760 B2
(45) Date of Patent: May 30, 2023

(54) SERVICE SET IDENTIFIER (SSID) FOR WIRELESS COMMUNICATIONS USING MULTIPLE LINK AGGREGATION

(71) Applicant: QUALCOMM Incorporated, San Diego, CA (US)

(72) Inventors: Sai Yiu Duncan Ho, San Diego, CA (US); Abhishek Pramod Patil, San Diego, CA (US); George Cherian, San Diego, CA (US); Alfred Asterjadhi, San Diego, CA (US); Yanjun Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 150 days.

(21) Appl. No.: 17/177,670

(22) Filed: Feb. 17, 2021

(65) Prior Publication Data

US 2021/0266998 A1    Aug. 26, 2021

Related U.S. Application Data

(60) Provisional application No. 62/981,006, filed on Feb. 24, 2020.

(51) Int. Cl.
*H04W 76/15* (2018.01)
*H04W 76/25* (2018.01)
*H04W 76/11* (2018.01)

(52) U.S. Cl.
CPC ............ *H04W 76/15* (2018.02); *H04W 76/11* (2018.02); *H04W 76/25* (2018.02)

(58) Field of Classification Search
CPC ..... H04W 76/15; H04W 76/11; H04W 76/25; H04W 84/12; H04W 48/12; H04W 48/16;
(Continued)

(56) References Cited

U.S. PATENT DOCUMENTS 9,036,509 B1 * 5/2015 Addepalli ......... H04W 52/0206
                                                          701/1
2019/0174577 A1    6/2019 Patil et al.
(Continued)

OTHER PUBLICATIONS

Ballantyne, Kelvert, Wahab Almuhtadi, and Jordan Melzer. "Autoconfiguration for faster WiFi community networks." 2015 IFIP/IEEE International Symposium on Integrated Network Management (IM). IEEE, 2015. (Year: 2015).*
(Continued)

*Primary Examiner* — Sharad Rampuria
(74) *Attorney, Agent, or Firm* — Qualcomm Incorporated; Dang M. Vo (57) ABSTRACT

This disclosure provides systems, methods, and apparatus for wireless communications. In one aspect, an apparatus may obtain, for a first access point (AP), a first service set identifier (SSID) associated with single-link communications and obtain, for a second AP, a second SSID associated with multi-link communications. The apparatus may obtain, from a wireless communication device, a management frame include a multi-link operation information field that carries a first SSID and obtain a multi-link indication for the wireless communication device based, at least in part, on the first SSID, the multi-link indication indicating whether the wireless communication device includes AP capable of link aggregation, and selectively associate with the wireless communication device based on the multi-link indication.

14 Claims, 8 Drawing Sheets

(58) Field of Classification Search
CPC ..... H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2019/0268221 A1* | 8/2019 | Xiao | H04W 40/244 |
| 2020/0221545 A1* | 7/2020 | Stacey | H04W 48/16 |
| 2021/0014911 A1* | 1/2021 | Patil | H04W 72/0446 |

OTHER PUBLICATIONS

International Search Report and Written Opinion—PCT/US2021/018470—ISA/EPO—dated May 10, 2021.
Wang H., (Quantenna): et al., "Multi-Link Upper-MAC Entity Instance & New Frame MAC Header", IEEE Draft, 11-19-1962-01-00BE-Multi-Link-Upper-MAC-Entity-Instance-NewFrame-MAC-Header, IEEE-SA Mentor, Piscataway, NJ USA vol. 802.11 EHT; 802.11be, No. 1, Jan. 15, 2020 (Jan. 15, 2020), pp. 1-16, XP068172579, Retrieved from the Internet: URL: https://mentor.ieee.org/802.11/dcn/19/11-19-1962-01-00be-multi-link-upper-mac-entity-instance-new-frame-mac-header.pptx. [retrieved on Jan. 15, 2020] slides 2-4, 10.

* cited by examiner

SERVICE SET IDENTIFIER (SSID) FOR WIRELESS COMMUNICATIONS USING MULTIPLE LINK AGGREGATION

CROSS-REFERENCE TO RELATED APPLICATIONS

This patent application claims priority to U.S. Provisional Patent Application No. 62/981,006 entitled "SERVICE SET IDENTIFIER (SSID) FOR WIRELESS COMMUNICATIONS USING MULTIPLE LINK AGGREGATION" and filed on Feb. 24, 2020 which is assigned to the assignee hereof. The disclosure of the prior application is considered part of and is incorporated by reference in this patent application.

TECHNICAL FIELD

This disclosure relates generally to wireless communications, and more specifically to a service set identifier (SSID) for wireless communications using multiple link aggregation.

DESCRIPTION OF THE RELATED TECHNOLOGY

A wireless local area network (WLAN) may be formed by one or more access points (APs) that provide a shared wireless communication medium for use by a number of client devices, also referred to as stations (STAs). The shared wireless medium may encompass multiple frequency bands (such as the 2.4 GHz, 5 GHz, or 6 GHz frequency bands) or multiple channels of one or more frequency bands. Link aggregation is a technique that may allow the AP to communicate with a particular STA over multiple concurrent communication "links." For example, to improve data throughput, the shared wireless medium may be divided into a primary link and one or more secondary links. The primary and secondary links may be of various bandwidths, for example, by bonding a number of 20 MHz-wide channels together to form 40 MHz-wide channels, 80 MHz-wide channels, or 160 MHz-wide channels.

The basic building block of a WLAN conforming to the Institute of Electronics Engineers (IEEE) 802.11 family of standards is a Basic Service Set (BSS), which is managed by the AP. Each BSS is identified by a service set identifier (SSID) that is advertised by the AP. Each AP periodically broadcasts beacon frames on the primary link to enable any STAs within wireless range of the AP to establish and maintain a communication link with the WLAN. Beacon frames, however, may not provide enough information to enable multi-link (ML) capable STAs to identify and associate with ML capable APs.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication performed by a wireless communication device. In some implementations, the method can include obtaining, for a first access point (AP) of the wireless communication device, a first service set identifier (SSID) associated with single-link communications, obtaining, for a second AP of the wireless communication device, a second SSID associated with multi-link (ML) communications, and transmitting one or more management frames carrying the first SSID and the second SSID, to one or more wireless stations (STAs).

In some implementations, the second SSID may be carried in a multi-link operation (MLO) information field of the management frame. In some other implementations, the first SSID and the second SSID may be carried in respective information elements of the management frame. In some implementations, the first SSID may be transmitted in a first management frame and the second SSID may be transmitted in a second management frame, different than the first management frame. In some implementations, the method may include establishing, with a first STA of the one or more STAs, a primary communication link based on the first SSID, and establishing, with the first STA, a secondary communication link based on the second SSID.

In some implementations, the first SSID may be associated with a first passphrase and the second SSID may be associated with a second passphrase different than the first passphrase. The first SSID and the second SSID may be the same value. In still other implementations, the first SSID and the second SSID may be associated with the same passphrase. In some implementations, the first SSID and the second SSID may be obtained from a user. In some implementations, the one or more management frames may include a beacon frame, a probe response frame, or a combination thereof.

Another innovative aspect of the subject matter described in this disclosure can be implemented as a wireless communication device. The wireless communication device may include at least one transceiver, at least one processor communicatively coupled with the at least one transceiver, and at least one memory communicatively coupled with the at least one processor and storing processor-readable code that, when executed by the at least one processor in conjunction with the at least one transceiver cause the wireless node to perform operations comprising: obtaining, for a first access point (AP) of the wireless communication device, a first service set identifier (SSID) associated with single-link communications, obtaining, for a second AP of the wireless communication device, a second SSID associated with a multi-link (ML) communications, and transmitting one or more management frames, carrying the first SSID and the second SSID, to one or more wireless stations (STAs).

In some implementations, the second SSID may be carried in the management frame. In some implementations, the second SSID may be carried in a multi-link operation (MLO) field of the management frame. In some implementations, the first SSID and the second SSID are carried in respective information elements of the management frame. In some implementations, the first SSID is transmitted in a first management frame and the second SSID is transmitted in a second management frame, different than the first management frame.

In some implementations, the wireless communication device may establish, with a first STA of the one or more STAs, a primary communication link based on the first SSID and establish, with the first STA, a secondary communication link based on the second SSID. In some aspects, the first SSID is associated with a first passphrase and the second SSID is associated with a second passphrase different than the first passphrase. In some implementations, the first SSID and the second SSID can have the same value. In some aspects, the first SSID and the second SSID may be associated with the same passphrase.

In some implementations, the first SSID and the second SSID are obtained from a user. In some other implementations, the one or more management frames include a beacon frame, a probe response frame, or a combination thereof.

Another innovative aspect of the subject matter described in this disclosure can be implemented as another method for wireless communication. In some implementations, the method can include receiving, from a wireless communication device, a management frame including a multi-link operation (MLO) information field that carries a first service set identifier (SSID), obtaining a multi-link indication of the wireless communication device based, at least in part, on the first SSID, the multi-link indication indicating whether the wireless communication device is capable of link aggregation, and selectively associating with the wireless communication device based on the obtained multi-link indication.

In some implementations, the wireless communication device may include an AP capable of link aggregation. In some implementations, the management frame may be a beacon frame or a probe response frame. In some other implementations, the management frame may carry a second SSID. In some implementations, the wireless communication device may obtain an indication that the second SSID is associated with an AP capable of single-link communications. In some implementations, the management frame may be a beacon frame or a probe response frame. In some other implementations, the management frame may carry a second SSID In some implementations, the wireless communication device may obtain an indication that the wireless communication device is capable of single-link communications based on the second SSID. In some implementations, the method may include establishing a primary communication link with the wireless communication device based on the second SSID; and establishing a second communication link with the wireless communication device based on the first SSID.

Another innovative aspect of the subject matter described in this disclosure can be implemented as a first wireless communication device. The first wireless communication device may include at least one transceiver, at least one processor communicatively coupled with the at least one transceiver, and at least one memory communicatively coupled with the at least one processor and storing processor-readable code that, when executed by the at least one processor in conjunction with the at least one transceiver may cause the first wireless communication device to perform operations comprising: receiving, from a second wireless communication device, a management frame including a multi-link operation (MLO) information field that carries a first service set identifier (SSID), obtaining a multi-link indication of the second wireless communication device based, at least in part, on the first SSID, the multi-link indication indicating whether the second wireless communication device is capable of link aggregation, and selectively associating with the second wireless communication device based on the obtained multi-link indication.

In some aspects, the management frame may be a beacon frame or a probe response frame. In some other implementations, the management frame may further carry a second SSID. In some aspects, the first wireless communication device may obtain an indication that the second wireless communication device is capable of single-link communications based on the second SSID. In some implementations, the first wireless communication device may establish a primary communication link with the wireless communication device based on the second SSID and establish a second communication link with the second wireless communication device based on the first SSID.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The term "multi-link" or "ML" may refer to various link aggregation techniques that may be used to aggregate transmissions across multiple communication links. A multi-link device (MLD) may be any device capable of multi-link communications. Thus, the terms "ML AP" and "AP MLD" may be used interchangeably to refer to an access point (AP) that is capable of link aggregation. Similarly, the terms "ML STA" and "STA MLD" (also referred to as a "non-AP MLD") may be used interchangeably to refer to a wireless station (STA) that is capable of link aggregation. The term "ML SSID" may refer to a service set identifier (SSID)

associated with an AP that is capable of link aggregation. The term "legacy STA" may refer to any STA that does not support link aggregation. The term "legacy AP" may refer to any AP that is not capable of link aggregation. The term "legacy SSID" may refer to a SSID associated with an AP that is not capable of link aggregation. The term "primary link" or "primary communication link" may refer to a set or subset of wireless channels on which peer devices (such as a STA and an AP) contend for access to a shared wireless medium. The term "secondary link" or "secondary communication link" may refer to any set or subset of wireless channels that are accessible by the peer devices for purposes of link aggregation.

Implementations of the subject matter described in this disclosure may be used for transmitting and receiving management frames that include legacy SSID and ML SSID information. In some implementations, the legacy SSID may be associated with a BSS that is capable of single-link communications between wireless devices, while the ML SSID may be associated with a BSS that is capable of multi-link communications. Example suitable management frames may include beacon frames and probe response frames. For example, each AP of an AP MLD may broadcast beacon frames that carry legacy SSID information indicating an SSID for its associated BSS. Each beacon frame may further carry ML SSID information indicating an SSID assigned to the AP MLD. The ML SSID information may be common to all APs associated with the AP MLD. Accordingly, beacon frames broadcast by different APs of an AP MLD may carry the same ML SSID information but different legacy SSID information.

Particular implementations of the subject matter described in this disclosure can be implemented to realize one or more of the following potential advantages. By including ML SSID information in management frames, an AP MLD may advertise its ability to support multi-link communications to STAs not yet associated with the AP MLD (or a BSS provided by the AP MLD). STA MLDs may look for ML information in management frames when scanning for a BSS to associate with. For example, a STA MLD may prefer to associate with an AP MLD to take advantage of the higher throughputs afforded by multi-link communications. Thus, in some aspects, the ML SSID information carried in management frames may help facilitate or streamline the process of establishing multiple communication links between a STA MLD and an AP MLD. Further, by including legacy SSID information in management frames (in addition to ML SSID information), an AP MLD may maintain support for legacy STAs that are not capable of multi-link communications.

Figure 1:
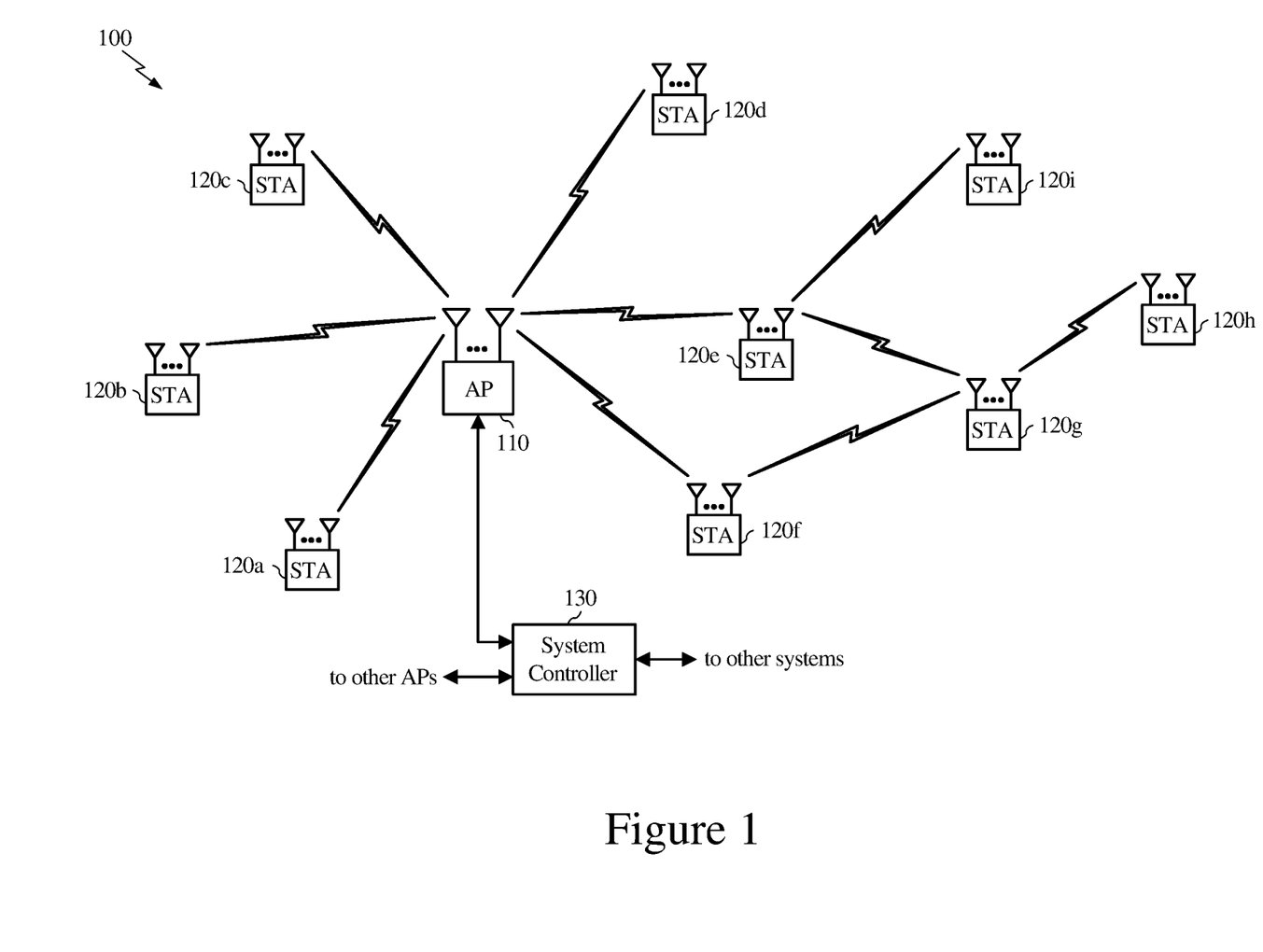
FIG. 1 shows a block diagram of an example wireless system.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory processor-readable medium (such as one or more nonvolatile memory elements, such as EPROM, EEPROM, Flash memory, a hard drive, etc.) that stores instructions for performing one or more operations described with respect to FIGS. 7 and 8.

Figure 2:
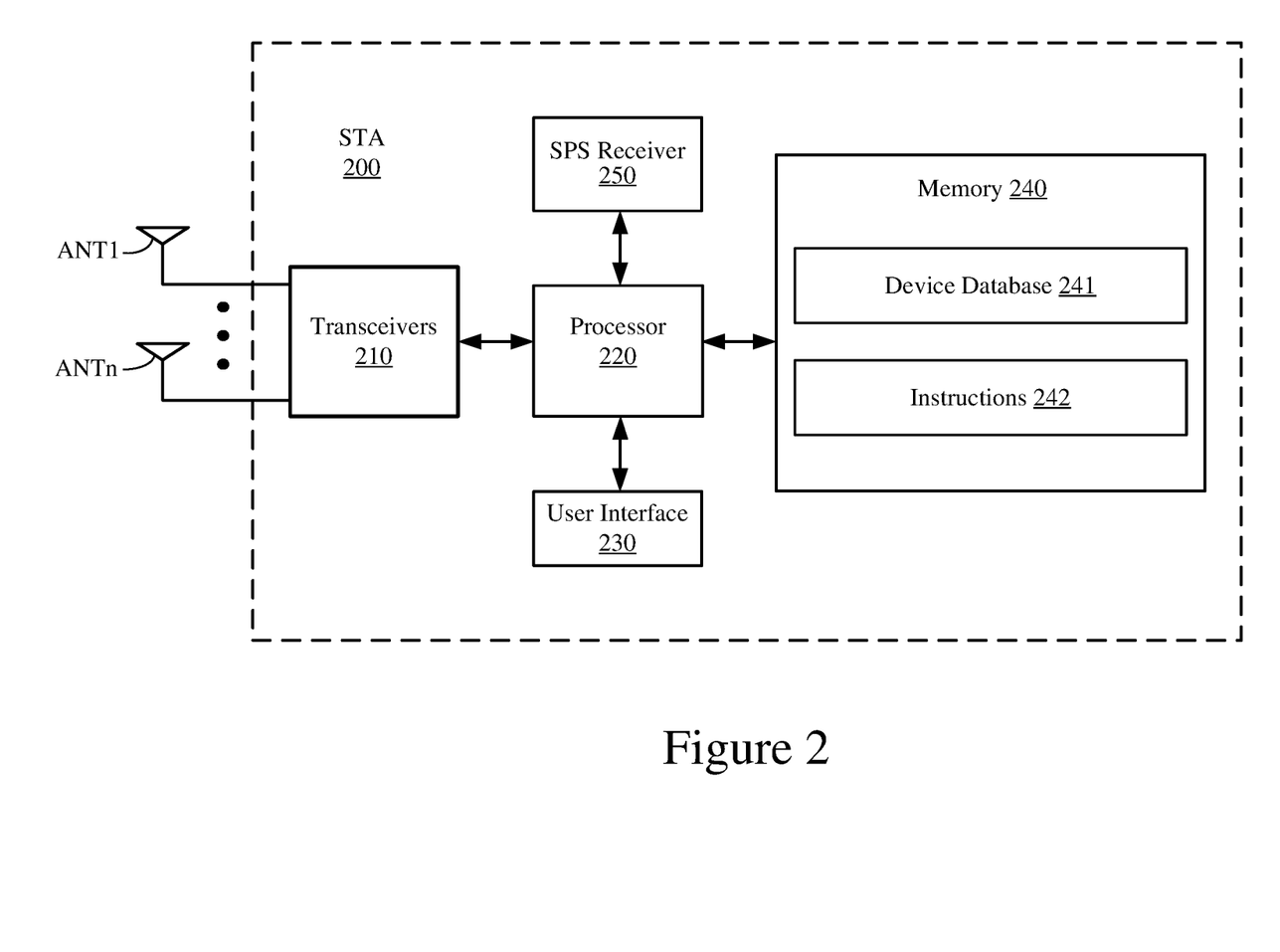
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable (such as processor-readable) media integrated into a single chip. In some other implementations, the processor 220 may be or include one or more Field Programmable Gate Arrays (FPGAs) or Programmable Logic Devices (PLDs).

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory processor-readable storage medium (such as one or more nonvolatile memory elements, such as EPROM, EEPROM, Flash memory, a hard drive, and so on) that may store processor-executable instructions 242 to perform all or a portion of one or more operations described in this disclosure.

Figure 3:
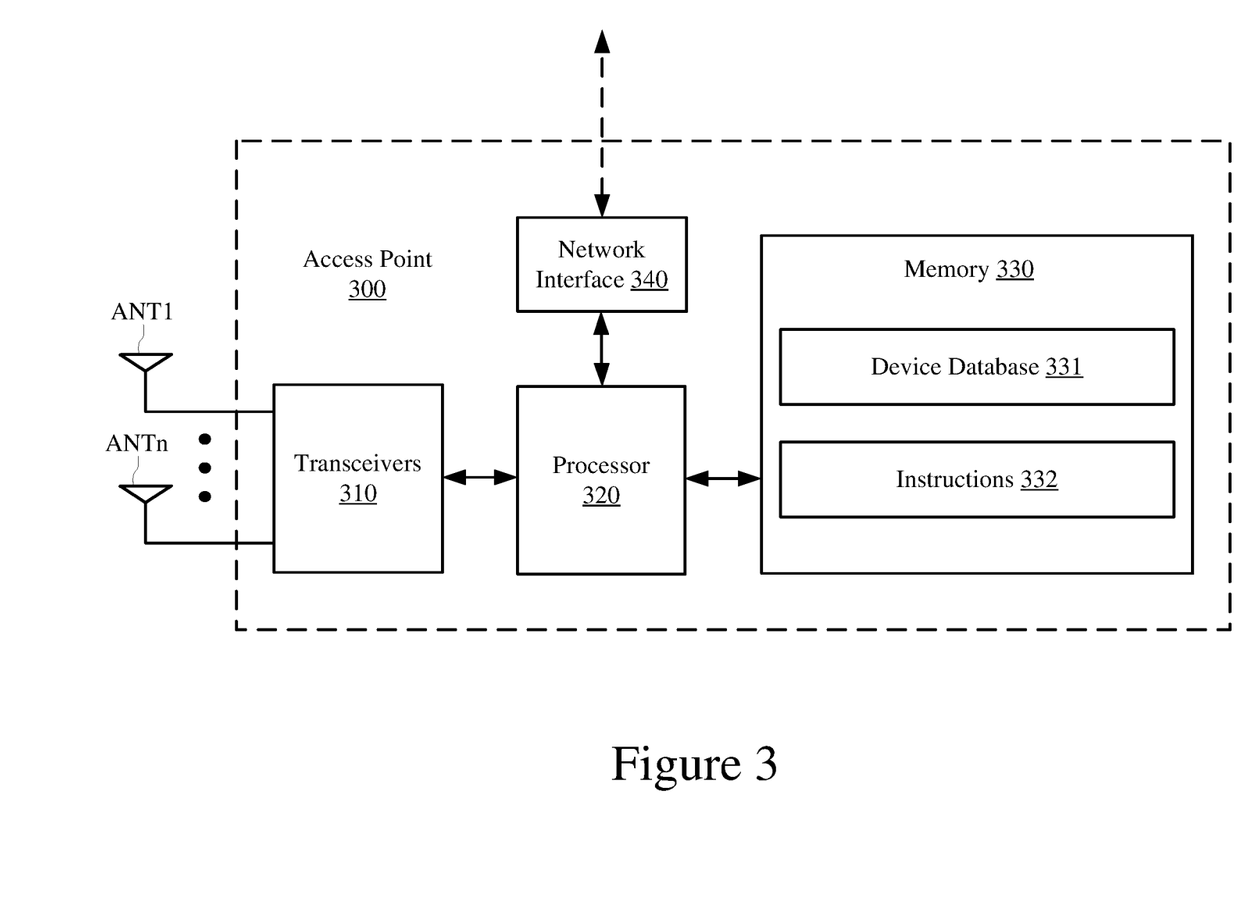
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory processor-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
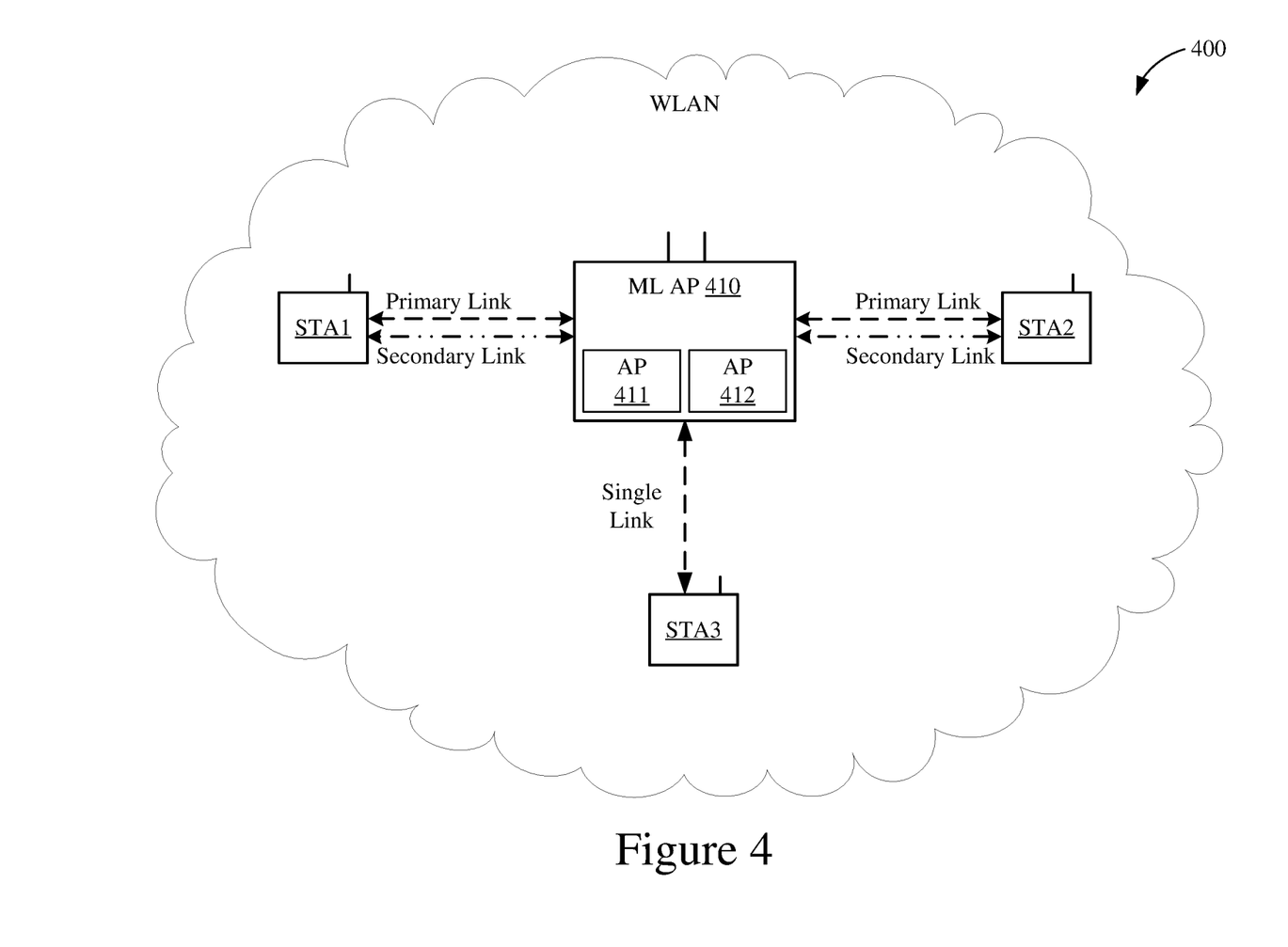
FIG. 4 shows a block diagram of another example wireless system.

FIG. 4 shows a block diagram of another example wireless system 400. The wireless system 400 includes a ML AP 410 and a number of wireless stations STA1-STA3. Although three wireless stations STA1-STA3 are shown in the example of FIG. 4 for simplicity, it is to be understood that the wireless system 400 may include any number of STAs. The ML AP 410 may be a wireless communication device that includes two or more APs such as AP 411 and AP 412. Each of the APs 411 and 412 may be an implementation of the AP 110 of FIG. 1. In some implementations, the APs 411 and 412 may be implemented as soft APs. The wireless stations STA1 and STA2 may be ML STAs (also referred to as STA MLDs) or wireless communication devices capable of communicating to other wireless communication devices with multiple concurrent communication links. In contrast, the wireless station STA3 may be a wireless communication device operating as a legacy STA capable of communicating through a single communication link.

In some implementations, the ML AP 410 may be capable of establishing multiple concurrent communication links with each of the wireless stations STA1 and STA2 via the APs 411 and 412. For example, the AP 411 may communicate with the wireless stations STA1 and STA2 via a primary link and the AP 412 may communicate with the wireless stations STA1 and STA2 via a secondary link. In some other implementations, the AP 412 may communicate via a primary link and the AP 411 may communicate with a secondary link. In the example of FIG. 4, each of the wireless stations STA1 and STA2 is shown to have only one secondary link. However, in some implementations, the ML AP 410 may establish any number of secondary links with any of the wireless stations STA1 and STA2.

In some implementations, the communication links may encompass different frequency bands. For example, the primary link may include one or more channels of the 5 GHz frequency band and the secondary link may include one or more channels of the 6 GHz frequency band. In some other implementations, the communication links may encompass different channels of the same frequency band. For example, the primary link may include a first subset of channels in the 6 GHz frequency band and the secondary link may include a second subset of channels in the 6 GHz frequency band. Still further, in some implementations, the communication links may encompass different channels of different frequency bands. For example, the primary link may include a first subset of channels in the 5 GHz frequency band and a first subset of channels in the 6 GHz frequency band, and the secondary link may include a second subset of channels in the 5 GHz frequency band and a second subset of channels in the 6 GHz frequency band. The 5 GHz and 6 GHz frequency bands are used here to illustrate rather than limit possible implementations. In some other implementations, the primary and secondary links may use any feasible frequency band and any feasible set or subset of channels within those frequency bands.

In some implementations, the ML AP 410 also may be capable of establishing a single communication link (such as a legacy communication link) with the wireless station STA3. In some implementations, the single communication link may include one or more channels of the 2.4 GHz frequency band, the 5 GHz frequency band, or any other feasible frequency bands. For example, the AP 411 or the AP 412 may communicate with the wireless station STA3 through any feasible frequency band or channel.

In some implementations, the ML AP 410 may transmit a management frame that includes a first service set identifier (SSID) associated with single-link communications (such as communication through a single communication link) and a second SSID associated with multi-link communications (such as communication through a primary and one or more secondary communication links). Example management frames may include, but are not limited to, a beacon frame and a probe response frame. For example, the first SSID may be associated with a Basic Service Set (BSS) that includes the AP 411 to serve legacy STAs, such as the wireless station STA3, through a primary link. The second SSID may be associated with a BSS that includes the ML AP 410 (including each of the APs 411 and 412) to serve ML STAs, such as the wireless stations STA1 and STA2, through primary and secondary links. In some other implementations, any of the APs 411 or 412 of the ML AP 410 may be associated with the primary link and the secondary links. In some implementations, the first SSID may be transmitted in a first management frame and the second SSID may be transmitted in a second management frame, separate from the first management frame. Further still, in some implementations, the second SSID may be included in one or more multi-link operation (MLO) information fields of the management frame. In some other implementations, the first SSID and the second SSID may be included in one or more information elements of the management frame.

In some implementations, legacy STAs may not be aware of the second SSID. That is, legacy STAs may receive the management frame that includes the second SSID but may ignore the second SSID and any associated data. In this manner, the operation of legacy STAs may not be affected by any second SSID information and the legacy STAs can continue to associate with the single-link capable APs, such as the AP 410. The first SSID and the second SSID may be user-supplied alphanumeric characters that help identify a BSS as a legacy or a multi-link capable BSS, respectively. In some implementations, the first SSID may be identical to the second SSID. A common SSID may enable a user with a ML capable STA to have an enhanced user experience when roaming between ML and legacy APs. When the same SSID is used for both the first and the second SSIDs (in other words, both the first and the second SSIDs have the same value), a roaming STA may more quickly associate with ML APs and legacy APs. In some implementations, the first SSID and the second SSID may be associated with the same passphrase. A passphrase may be one or more words or symbols that are used to grant access to an associated BSS. A common passphrase may enable a STA to more quickly associate between the first and second SSIDs. In some other implementations, each SSID may be associated with different passphrases. For example, the first SSID may be associated with a first passphrase and the second SSID may be associated with a second passphrase.

Figure 5:
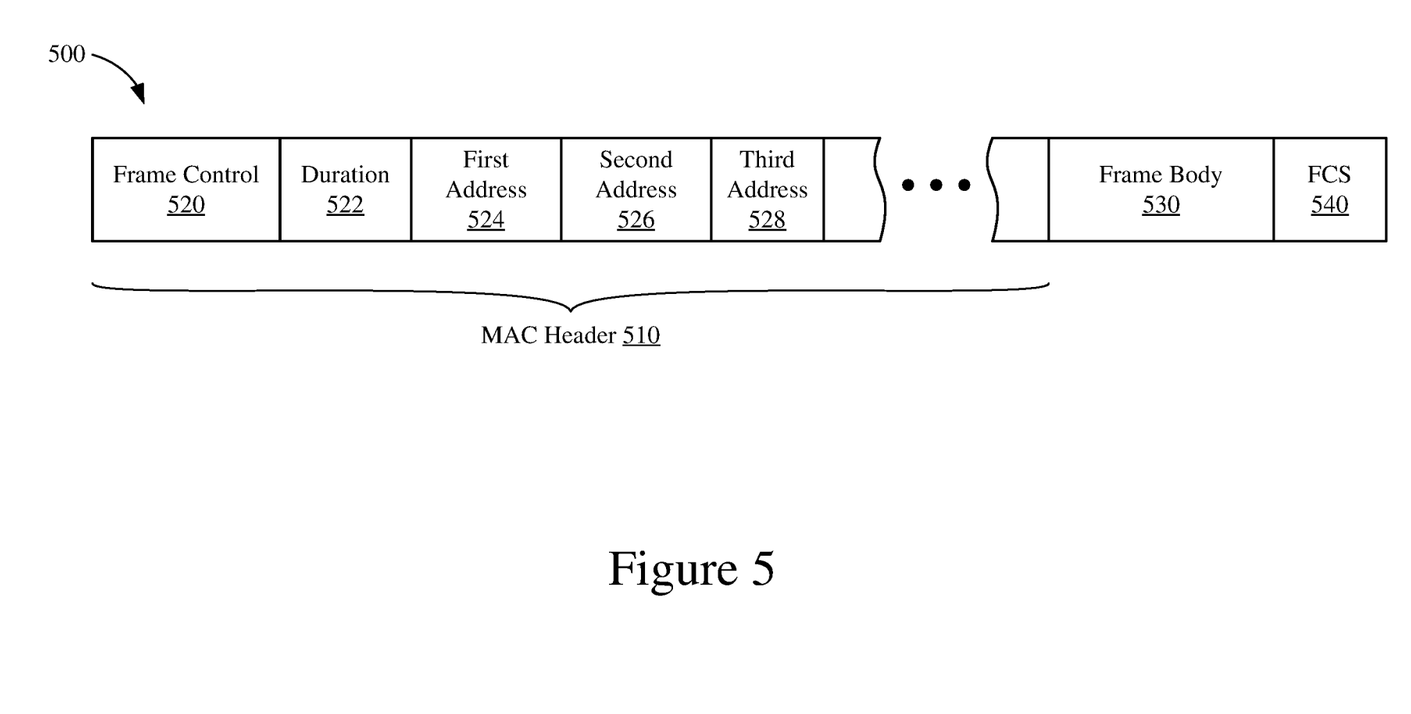
FIG. 5 shows an example management frame.

FIG. 5 shows an example management frame 500. The management frame 500 includes a MAC header 510, a frame body 530, and a frame check sequence (FCS) 540. The MAC header 510 may include a frame control field 520, a duration field 522, a first address field 524, a second address field 526, and a third address field 528. In some implementations, the MAC header 510 may include other fields, fewer fields, or more fields.

The frame control field 520 may describe the form or function of the management frame 500. For example, the frame control field 520 may identify the management frame 500 as a particular type of management frame. In some instances, the frame control field 520 may identify the management frame 500 as a beacon frame or as a probe response frame. The duration field 522 may describe the duration of the management frame 500 in milliseconds. The first address field 524 may describe a destination address of the management frame 500. In some implementations, the first address field 524 may contain a broadcast or multicast address. Broadcast or multicast addresses may indicate that the management frame 500 is intended for a plurality of wireless communication devices. The second address field 526 may describe a source address of the management frame 500. For example, the second address field 526 may include a MAC address of the wireless device transmitting the management frame 500. The third address field 528 may include a BSSID. In some implementations, the BSSID may be the MAC address of the wireless device transmitting the management frame 500. Thus, the BSSID of the third address field 528 may correspond to the first SSID as described with respect to FIG. 4. The FCS 540 may include error-detecting codes enabling error detection of data in the management frame 500.

In some implementations, the frame body 530 may include an ML SSID. The ML SSID may be a user-supplied alphanumeric identifier that can identify an ML AP (such as the ML AP 410 of FIG. 4) or an associated BSS. Thus, the ML SSID may be associated with an AP that supports concurrent, multi-link communications. Furthermore, the fields of the frame body 530 that include the ML SSID may be referred to as MLO information fields. The ML SSID may correspond to the second SSID as described with respect to FIG. 4. The frame body 530 also may include a legacy SSID. The legacy SSID may be another user supplied alphanumeric identifier that can identify a BSS associated with single-link communications. In some implementations, the legacy SSID within the frame body 530 may be identical to the SSID included within the third address field 528.

Figure 6:
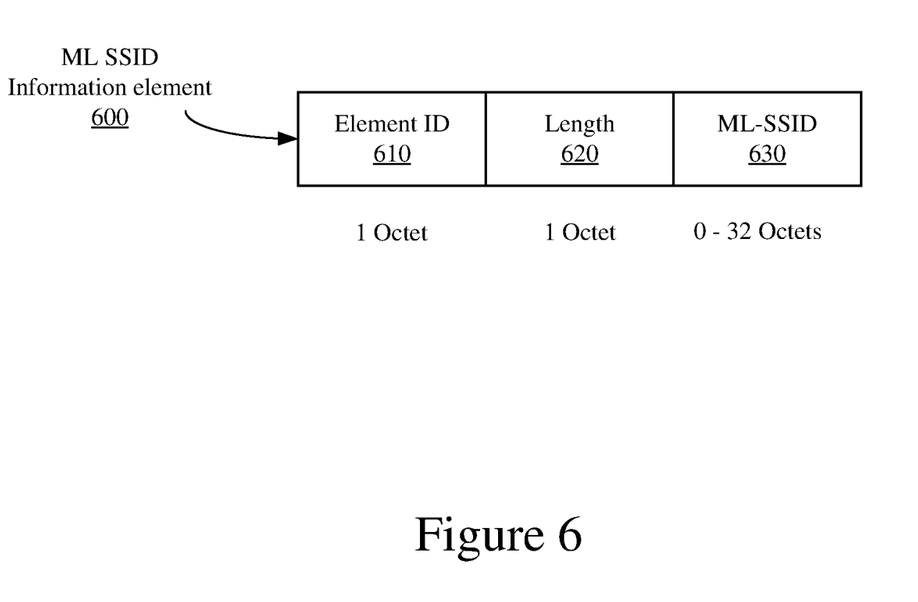
FIG. 6 shows an example diagram of a multi-link service set identifier (SSID) information element.

FIG. 6 shows an example diagram of an ML SSID information element 600. The ML SSID information element 600 may include an element ID field 610, a length field 620, and an ML SSID field 630. The ML SSID information element 600 may be included in the frame body 530 of the management frame 500 of FIG. 5.

The element ID field 610 may identify the associated information element as a ML SSID information element. The length field 620 may describe the length of the ML SSID information element 600. In some implementations, the element ID field 610 and the length field 620 may be one octet in size. In some other implementations, the element ID field 610 and the length field 620 may be any feasible size. The ML SSID field 630 may be any feasible descriptor assigned by a user for the ML AP. In some implementations, the ML SSID field 630 may be between zero and thirty-two octets in size. In some other implementations, the ML SSID field 630 may be any feasible size. Furthermore, in some implementations, the ML SSID information element 600 may be similar to a legacy SSID information element.

Figure 7:
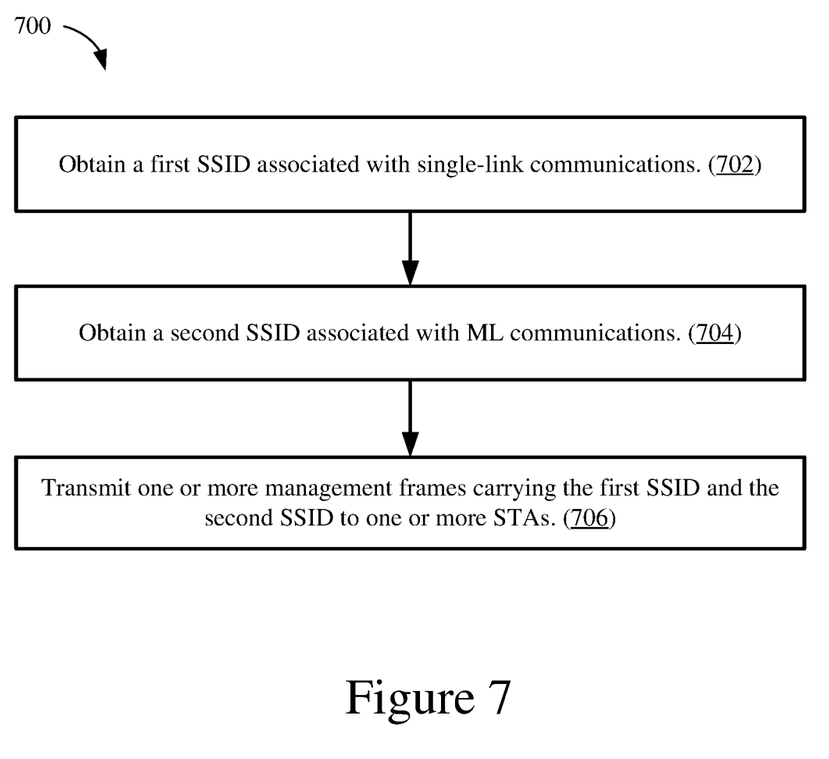
FIG. 7 shows an illustrative flowchart depicting an example operation for wireless communication.

FIG. 7 shows an illustrative flowchart depicting an example operation 700 for wireless communication. The example operation 700 may be performed by an ML AP such as the ML AP 410 of FIG. 4 or any other suitable AP, wireless communication device, or wireless node. Some implementations may perform the operations described herein with additional operations, fewer operations, operations in a different order, operations in parallel, and some operations differently.

The ML AP obtains a first SSID associated with single-link communications (702). In some implementations, the first SSID may be a legacy SSID that is associated with an AP that is capable of single-link communications. In some implementations, a value for the first SSID may be obtained from a user through a suitable user interface.

The ML AP obtains a second SSID (704) associated with ML communications. In some implementations, the second SSID may be an ML SSID that is associated with an ML AP that is capable of link aggregation. In some implementations, a value of the second SSID may be obtained from a user through a suitable user interface.

The ML AP transmits one or more management frames carrying the first SSID and the second SSID to one or more STAs (706). In some implementations, the first SSID and the second SSID may be included within any feasible information elements or fields, including MLO fields, of the management frame. For example, the first SSID may be a legacy SSID included in the third address field 528 and the second SSID may be a ML SSID included in the frame body of the management frame 500. Furthermore, the first SSID and the second SSID may be transmitted in the same management frame or in separate management frames. Still further, in some implementations, the one or more management frames may include a beacon frame, a probe response frame or a combination thereof. The values for first SSID and the second SSID may be the same or may be different. Further, the passphrases associated with first SSID and the second SSID may be the same or different.

In some implementations, the ML AP may establish communication links with one or more STAs based on the first and second SSIDs. For example, the ML AP may establish a primary communication link with a first ML STA based on the first SSID and establish a secondary communication link with the first ML STA based on the second SSID.

In some implementations, the ML AP may include a plurality of physical, logical, or virtual APs to operate as one or more single-link APs and ML APs. For example, the ML AP may include a first physical, logical, or virtual AP to operate as a legacy (such as single-link) AP and transmit the legacy SSID and a second physical, logical, or virtual AP to operate as a ML AP and transmit the ML SSID.

Figure 8:
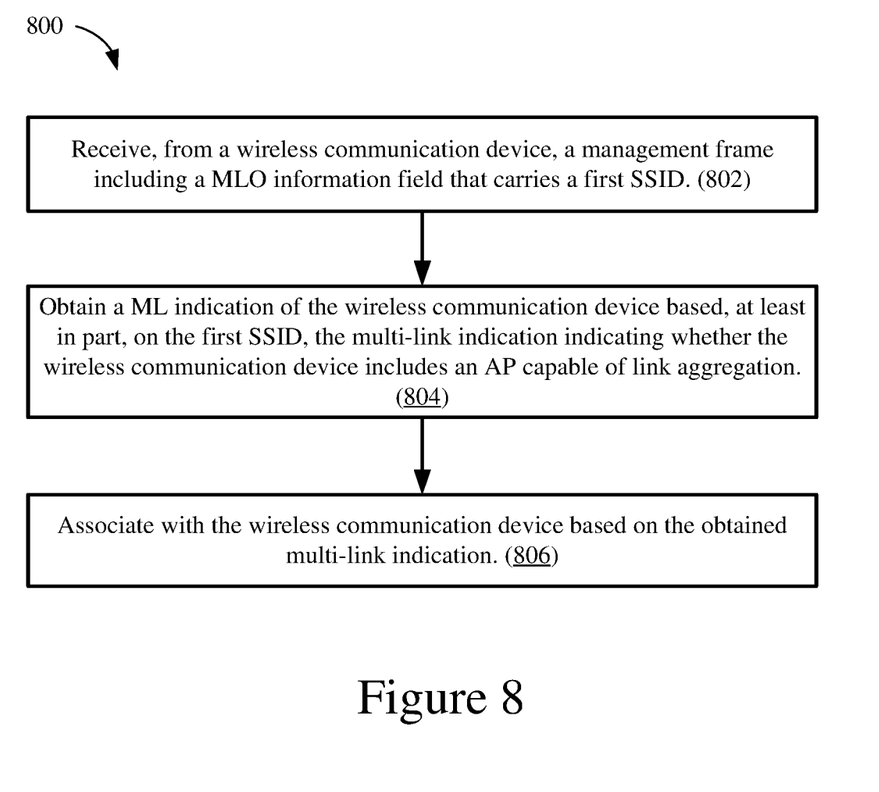
FIG. 8 shows illustrative flowchart depicting another example operation for wireless communication.

FIG. 8 shows illustrative flowchart depicting another example operation 800 for wireless communication. The example operation 800 may be performed by an ML STA such as the wireless stations STA1 and STA2 of FIG. 4, or any suitable STA or wireless communication device.

The ML STA obtains, from a wireless communication device, a management frame including a MLO information field that carries a first SSID (802). The management frame may be transmitted by an AP such as the ML AP 410 of FIG. 4, or any suitable AP, wireless communication device, or wireless node. The first SSID may be a ML SSID that is an alphanumeric identifier associated with an AP capable of link aggregation. In some implementations, the management frame may be a beacon frame or a probe response frame. The MLO information fields may be any feasible information elements or fields in the management frame that include ML SSID information.

The ML STA obtains a ML indication of the wireless communication device based, at least in part, on the first SSID, the ML indication indicating whether the wireless communication device includes an AP capable of link aggregation (804). In some implementations, the ML STA may locate one or more MLO information fields or other information elements in the management frame that include the first SSID. Presence of the first SSID may indicate that the associated AP is a ML AP.

The ML STA associates with the wireless communication device based on the obtained multi-link indication (806). For example, the ML STA may associate with the ML AP associated with the first SSID using a corresponding passphrase. In some implementations, the ML STA also may receive a second SSID associated with an AP that is not capable of link aggregation (such as a legacy AP that is capable of single-link communications). The second SSID may be a legacy SSID. The ML STA also may associate with the legacy AP associated with the legacy SSID. The passphrases associated with the first SSID and the second SSID may be the same or different. After associating with the ML AP, the ML STA may communicate with the ML AP using a single communication link or multiple communication links. For example, the ML STA establish a primary communication link with the ML AP based on the second SSID and establish a secondary communication link with the ML AP based on the first SSID.

Implementation examples are described in the following numbered clauses:

1. A method for wireless communication performed by a wireless communication device, including:
obtaining, for a first access point (AP) of the wireless communication device, a first service set identifier (SSID) associated with single-link communications;
obtaining, for a second AP of the wireless communication device, a second SSID associated with a multi-link (ML) communications; and
transmitting one or more management frames, carrying the first SSID and the second SSID, to one or more wireless stations (STAs).

2. The method of clause 1, where the second SSID is carried in a multi-link operation (MLO) information field of the management frame.

3. The method of any of clauses 1 or 2, where the first SSID and the second SSID are carried in respective information elements of the management frame.

4. The method of any of clauses 1-3, where the first SSID is transmitted in a first management frame and the second SSID is transmitted in a second management frame, different than the first management frame.

5. The method of any of clauses 1-4, further including:
establishing, with a first STA of the one or more STAs, a primary communication link based on the first SSID; and
establishing, with the first STA, a secondary communication link based on the second SSID.

6. The method of any of clauses 1-5, where the first SSID is associated with a first passphrase and the second SSID is associated with a second passphrase different than the first passphrase.

7. The method of any of clauses 1-6, where the first SSID and the second SSID have the same value.

8. The method of any of clauses 1-5 or 7, where the first SSID and the second SSID are associated with the same passphrase.

9. The method of any of clauses 1-8, where the first SSID and the second SSID are obtained from a user.

10. The method of any of clauses 1-9, where the one or more management frames include a beacon frame, a probe response frame, or a combination thereof.

11. A wireless communication device, including:
at least one transceiver;
at least one processor communicatively coupled with the at least one transceiver; and at least one memory communicatively coupled with the at least one processor and storing processor-readable code that, when executed by the at least one processor in conjunction with the at least one transceiver, causes the wireless node to perform the method of any one or more of clauses 1-10.

12. A method for wireless communication, including:
receiving from a wireless communication device, a management frame including a multi-link operation (MLO) information field that carries a first service set identifier (SSID);
obtaining a multi-link indication of the wireless communication device based, at least in part, on the first SSID, the multi-link indication indicating whether the wireless communication device is capable of link aggregation; and
selectively associating with the wireless communication device based on the obtained multi-link indication.

13. The method of clause 12, where the management frame is a beacon frame or a probe response frame.

14. The method of any of clauses 12 or 13, where the management frame carries a second SSID.

15. The method of any of clauses 12-14, further including:
obtaining an indication that the wireless communication device is capable of single-link communications based on the second SSID.

16. The method of any of clauses 12-15, further including:
establishing a primary communication link with the wireless communication device based on the second SSID; and
establishing a secondary communication link with the wireless communication device based on the first SSID 17. A first wireless communication device including:
at least one transceiver;
at least one processor communicatively coupled with the at least one transceiver; and
at least one memory communicatively coupled with the at least one processor and storing processor-readable code that, when executed by the at least one processor in conjunction with the at least one transceiver, causes the wireless communication device to perform the method of any one or more of clauses 12-16.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a processor-readable medium. The processes of a method or algorithm disclosed herein may be implemented in a processor-executable software module which may reside on a processor-readable medium. Processor-readable media includes both computer storage media and communication media including any medium that can be enabled to transfer a computer program from one place to another. A storage media may be any available media that may be accessed by a computer. By way of example, and not limitation, such processor-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a processor-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of processor-readable media. Additionally, the operations of a method or algorithm may reside as one or any combination or set of codes and instructions on a machine readable medium and processor-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed at a wireless communication device, comprising:
   obtaining, for a first access point (AP) of the wireless communication device, a first service set identifier (SSID) associated with single-link communications;
   obtaining, for a second AP of the wireless communication device, a second SSID associated with multi-link (ML) communications, wherein the first SSID and the second SSID have the same value or are associated with the same passphrase;
   transmitting one or more management frames, carrying the first SSID or the second SSID, to wireless stations (STAs); and
   establishing, with a first STA of the STAs, a single communication link via a first basic service set identifier (BSSID) of the first AP; and
   establishing, with a second STA of the STAs, multi communication links via a second BSSID of the second AP, the single communication link and multi communication links being in one coverage area.

2. The method of claim 1, wherein the first SSID or the second SSID is carried in an information elements of the one or more management frames.

3. The method of claim 1, wherein the first SSID and the second SSID are obtained from a user.

4. The method of claim 1, wherein the one or more management frames include a beacon frame, a probe response frame, or a combination thereof.

5. The method of claim 1, wherein the first SSID is associated with a legacy basic service set (BSS) and the second SSID is associated with a multi-link capable BSS.

6. A wireless communication device, comprising:
   at least one transceiver;
   at least one processor communicatively coupled with the at least one transceiver; and
   at least one memory communicatively coupled with the at least one processor and storing processor-readable code that, when executed by the at least one processor in conjunction with the at least one transceiver, causes the wireless communication device to perform operations, comprising:

obtain, for a first access point (AP) of the wireless communication device, a first service set identifier (SSID) associated with single-link communications;

obtain, for a second AP of the wireless communication device, a second SSID associated with a multi-link (ML) communications, wherein the first SSID and the second SSID have the same value or are associated with the same passphrase;

transmit one or more management frames, carrying the first SSID or the second SSID, to wireless stations (STAs); and establish, with a first STA of the STAs, a single communication link via a first basic SSID (BSSID) of the first AP; and establish, with a second STA of the STAs, multi communication links via a second BSSID of the second AP, the single communication link and multi communication links being in one coverage area.

7. The wireless communication device of claim 6, wherein the first SSID is carried in an information elements of the one or more management frames.

8. The wireless communication device of claim 6, wherein the first SSID and the second SSID are obtained from a user.

9. The wireless communication device of claim 6, wherein the one or more management frames include a beacon frame, a probe response frame, or a combination thereof.

10. The wireless communication device of claim 6, wherein the first SSID is associated with a legacy basic service set (BSS) and the second SSID is associated with a multi-link capable BSS.

11. A method for wireless communication at a station, comprising:

receiving, from a wireless communication device, a management frame including a multi-link operation (MLO) information field that carries a service set identifier (SSID) being associated with single-link and multi-link communications;

obtaining a multi-link indication of the wireless communication device based, at least in part, on the SSID, the multi-link indication indicating whether the wireless communication device is capable of link aggregation, the wireless communication device comprising a first access point (AP) and a second AP; and based on the multi-link indication, establish, with the first AP, multi communication links via a basic service set identifier (BSSID) of the first AP, the multi communication links being in one coverage area.

12. The method of claim 11, wherein the management frame is a beacon frame or a probe response frame.

13. A station comprising:

at least one transceiver;

at least one processor communicatively coupled with the at least one transceiver; and at least one memory communicatively coupled with the at least one processor and storing processor-readable code that, when executed by the at least one processor in conjunction with the at least one transceiver, causes the station to perform operations, comprising:

receive, from a wireless communication device, a management frame including a multi-link operation (MLO) information field that carries a service set identifier (SSID);

obtain a multi-link indication of the wireless communication device based, at least in part, on the SSID, the multi-link indication indicating whether the wireless communication device is capable of link aggregation, the wireless communication device comprising a first access point (AP) and a second AP; and based on the obtained multi-link indication, establish, with the first AP communication, multi communication links via a basic service set identifier (BSSID) of the first AP, the multi communication links being in one coverage area.

14. The station of claim 13, wherein the management frame is a beacon frame or a probe response frame.

* * * * *